(12) United States Patent
Shin

(10) Patent No.: US 11,312,371 B2
(45) Date of Patent: Apr. 26, 2022

(54) APPARATUS AND METHOD FOR CONTROLLING VEHICLE

(71) Applicant: MANDO MOBILITY SOLUTIONS CORPORATION, Pyeongtaek-si (KR)

(72) Inventor: JunSik Shin, Seoul (KR)

(73) Assignee: MANDO MOBILITY SOLUTIONS CORPORATION, Pyeongtaek-si (KR)

( * ) Notice: Subject to any disclaimer, the term of this patent is extended or adjusted under 35 U.S.C. 154(b) by 49 days.

(21) Appl. No.: 16/831,616

(22) Filed: Mar. 26, 2020

(65) Prior Publication Data

US 2020/0307560 A1 Oct. 1, 2020

(30) Foreign Application Priority Data

Mar. 27, 2019 (KR) .................. 10-2019-0034801

(51) Int. Cl.
*B60W 30/08* (2012.01)

(52) U.S. Cl.
CPC .......... *B60W 30/08* (2013.01); *B60W 2420/52* (2013.01); *B60W 2552/50* (2020.02); *B60W 2554/20* (2020.02); *B60W 2554/801* (2020.02); *B60W 2554/804* (2020.02)

(58) Field of Classification Search
CPC ......... B60W 2420/52; B60W 2552/50; B60W 2554/20; B60W 2554/801; B60W 2554/804; B60W 30/08; G01S 13/44; G01S 13/46; G01S 13/50; G01S 13/931; G01S 2013/462; G01S 2013/932; G01S 7/414; G01S 7/415
See application file for complete search history.

(56) References Cited

U.S. PATENT DOCUMENTS

| 2003/0179129 A1* | 9/2003 | Tamatsu ................. G01S 7/354 342/70 |
| 2005/0174282 A1* | 8/2005 | Nakanishi ............ G01S 13/345 342/109 |
| 2005/0285778 A1* | 12/2005 | Shinagawa .......... G01S 7/4026 342/173 |
| 2009/0102629 A1* | 4/2009 | Kaller ................... G01S 13/931 340/435 |

(Continued)

FOREIGN PATENT DOCUMENTS

| DE | 102014223408 A1 * | 5/2015 | ...... B60W 30/18145 |
| JP | 2004-220233 A | 8/2004 | |

(Continued)

*Primary Examiner* — Babar Sarwar
(74) *Attorney, Agent, or Firm* — Hauptman Ham, LLP

(57) ABSTRACT

The present disclosure provides a vehicle control apparatus and a vehicle control method comprising a radar for receiving radar signals transmitted from outside the vehicle and reflected from objects around the vehicle and processing the received radar signals to obtain detection data for the objects, and a controller for determining a stationary object among the objects based on the detection data, extracting feature points, determining whether the stationary object is a guardrail based on the extracted feature points, and determining a false target among the objects based on the guardrail. According to the present disclosure, it is possible to prevent the unrecognition or misrecognition of the control targets due to the guardrail.

18 Claims, 13 Drawing Sheets

(56) References Cited

U.S. PATENT DOCUMENTS

| | | | |
|---|---|---|---|
| 2011/0205102 A1* | 8/2011 | Shibata | G01S 13/345 342/70 |
| 2011/0261168 A1* | 10/2011 | Shima | G06V 20/58 348/47 |
| 2015/0054673 A1* | 2/2015 | Baba | G01S 13/867 342/27 |
| 2015/0338505 A1* | 11/2015 | Oshima | G01S 7/28 342/107 |
| 2017/0053533 A1* | 2/2017 | Kuroda | G06T 7/60 |
| 2017/0307749 A1* | 10/2017 | Shimizu | G08G 1/165 |
| 2017/0309181 A1* | 10/2017 | Lee | B60Q 5/006 |
| 2017/0327118 A1* | 11/2017 | Masui | B60W 40/072 |
| 2017/0350712 A1* | 12/2017 | Tateishi | G01C 21/30 |
| 2018/0178783 A1* | 6/2018 | Saiki | G08G 1/166 |
| 2018/0341012 A1* | 11/2018 | Takada | G01S 7/414 |
| 2020/0148201 A1* | 5/2020 | King | B60W 60/0027 |
| 2020/0209370 A1* | 7/2020 | Zhang | G01S 13/931 |

FOREIGN PATENT DOCUMENTS

| | | |
|---|---|---|
| KR | 10-2014-0052496 A | 5/2014 |
| KR | 10-2016-0081507 A | 7/2016 |
| KR | 10-1655682 B1 | 9/2016 |

\* cited by examiner

APPARATUS AND METHOD FOR CONTROLLING VEHICLE

CROSS REFERENCE TO RELATED APPLICATION

This application claims priority from Korean Patent Application No. 10-2019-0034801, filed on Mar. 27, 2019, which is hereby incorporated by reference for all purposes as if fully set forth herein.

BACKGROUND OF THE INVENTION

1. Field of the Invention

The present disclosure relates to a vehicle control apparatus and method capable of determining a false target detected through a radar sensor.

2. Description of the Prior Art

In recent years, as the demand for vehicle performance as well as the demand for convenience and safety of the driver increase, the research and development for a driver assistance system (DAS) assisting control of the vehicle based on information obtained through a sensor mounted on the vehicle for an autonomous driving have been actively conducted.

The vehicle radar may be a very important sensor for detecting the position and speed of a target and performing vehicle speed control necessary for a driver assistance system or autonomous driving. Therefore, the detection performance of the vehicle radar is a very important part of the driver assistance system or autonomous driving technology.

In the case that the vehicle is traveling close to the guardrail, the mirror target generated by the reflected wave having multiple paths due to the high propagation reflection coefficient of the guardrail may be one of the factors that degrade the detection performance of the vehicle radar. The mirror target is one of the false targets, and when controlling for the driver assistance system or autonomous driving, the control target may be unrecognized by merging into the mirror target, or may cause the position of the control target to be misrecognized as the position of the mirror target.

Therefore, it is necessary to accurately determine the false target so that the performance of the vehicle radar can be maintained even in such a case.

SUMMARY OF THE INVENTION

For this background, an object of the present disclosure is to provide a vehicle control apparatus and method to prevent the unrecognition or misrecognition of control targets due to the guardrails by determining false targets caused by the guardrails among objects detected through radars.

In accordance with an aspect of the present disclosure, there is provided a control apparatus of a vehicle comprising a radar for receiving radar signals transmitted from outside the vehicle and reflected from objects around the vehicle and processing the received radar signals to obtain detection data for the objects, and a controller for determining a stationary object among the objects based on the detection data, extracting feature points, determining whether the stationary object is a guardrail based on the extracted feature points, and determining a false target among the objects based on the guardrail.

In accordance with another aspect of the present disclosure, there is provided a control method of the vehicle comprising: obtaining detection data on objects around the vehicle through a radar; determining a stationary object among the objects based on the detection data; extracting feature points for the stationary object; determining whether the stationary object is a guardrail based on the extracted feature points; and determining a false target among the objects based on the guardrail.

According to the present disclosure, the present disclosure can provide the vehicle control apparatus and the vehicle control method capable of more safely controlling the vehicle by preventing the unrecognition or misrecognition for the control targets due to the guardrail by determining the false target caused by the guardrail among objects detected through the radar.

DETAILED DESCRIPTION OF THE EXEMPLARY EMBODIMENTS

Figure 1:
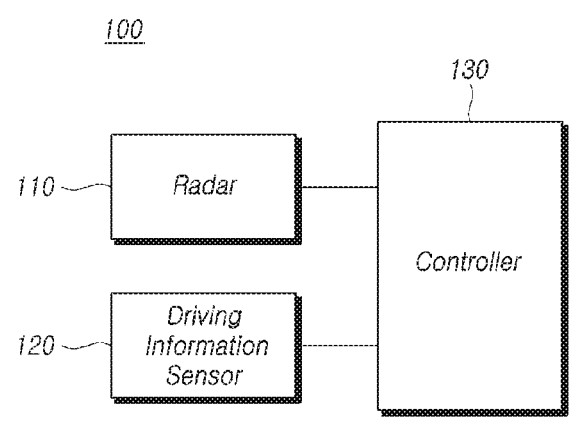
FIG. 1 is a block diagram of the vehicle control apparatus according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Unless otherwise defined, all terms (including technical and scientific terms) used in the present disclosure may be used as meanings commonly understood by those skilled in the art to which the embodiments of the present disclosure pertain. In addition, terms to be described later are terms defined in consideration of functions in the embodiments of the present disclosure, which may vary according to a user's or operator's intention or practice. Therefore, the definition should be made based on the contents throughout the present disclosure.

In the present disclosure, a vehicle may be a concept including an automobile, a motorcycle, and the like. In addition, the vehicle may be a concept including all of an internal combustion engine vehicle having an engine as a power source, a hybrid vehicle having an engine and an electric motor as a power source, an electric vehicle having an electric motor as a power source, and the like. Hereinafter, an automobile or a vehicle is described as an example.

In the following description, the front means the forward driving direction of the vehicle, and the rear means the backward driving direction of the vehicle. Further, the left side of the vehicle means the left side of the vehicle's forward running direction, and the right side of the vehicle means the right side of the vehicle's forward traveling direction. In addition, the rear side of the vehicle means left or right based on the reverse driving direction of the vehicle.

In the present disclosure, an object may mean a moving object such as another vehicle or a person around the vehicle, or an object including an infrastructure facility around the vehicle or the like. The target may be used interchangeably with an object, and may be used as a meaning of the moving object that can be used to control a vehicle among objects.

Hereinafter, a vehicle control apparatus and method according to embodiments of the present disclosure will be described with reference to the accompanying drawings.

FIG. 1 is a block diagram of the vehicle control apparatus according to the present disclosure.

Referring to FIG. 1, the vehicle control apparatus 100 according to the present disclosure may include the radar 110 for receiving radar signals transmitted from outside the vehicle and reflected from objects around the vehicle and processing the received radar signals to obtain detection data for the objects, and the controller 130 for determining a stationary object among the objects based on the detection data, extracting feature points, determining whether the stationary object is a guardrail based on the extracted feature points, and determining a false target among the objects based on the guardrail.

The radar 110 may include at least one of a front radar mounted on the front of the vehicle, a rear radar mounted on the rear of the vehicle, and a lateral radar or rear-side radar mounted on each side of the vehicle. The present disclosure may be preferably applied to the front radar, but is not limited thereto.

The radar 110 may include at least one transmission antenna for transmitting a radar signal to the outside of the vehicle and at least one receiving antenna for receiving a radar signal reflected from the object around the vehicle.

The radar 110 may analyze a transmission signal and a reception signal to process data, and accordingly, may detect information about an object, and may include an electronic control unit (ECU) or processor. Data transmission or signal communication from the radar sensor of the radar 110 to the ECU may use a communication link such as an appropriate vehicle network bus.

According to an example, the radar 110 may include a multi-dimensional antenna array and a signal transmission/reception method of multiple-input multiple-output (MIMO) to form a virtual antenna aperture larger than an actual antenna aperture. For example, to achieve horizontal and vertical angular precision and resolution, a two-dimensional antenna array may be used. If the two-dimensional antenna array is used, signals may be transmitted and received by two scans separately time-multiplexed horizontally and vertically, and MIMO can be used separately from the two-dimensional horizontal and vertical scans (time multiplexed).

In an example, the radar 110 may utilize a two-dimensional antenna array configuration including a transmission antenna unit including a total of 12 transmission antennas (Tx) and a receiving antenna unit including 16 receiving antennas (Rx). As a result, it is possible to have a total of 192 virtual receiving antenna arrangements.

The transmission antenna unit may include three transmission antenna groups each including four transmission antennas. In this case, the first transmission antenna group may be spaced a predetermined distance in the vertical direction from the second transmission antenna group, and the first or second transmission antenna group may be spaced a predetermined distance in the horizontal direction from the third transmission antenna group.

In addition, the receiving antenna unit may include four receiving antenna groups each including four receiving antennas. Each receiving antenna group may be arranged to be spaced apart in the vertical direction, and the receiving antenna unit may be disposed between the first transmission antenna group and the third transmission antenna group which are spaced apart in the horizontal direction.

In one embodiment, the radar 110 may include a radar housing accommodating a circuit board including the transmission and receiving antenna and a circuit, and a radome constituting an outer element of the radar housing. In this case, the radome may be made of a material capable of reducing the attenuation of the transmitted and received radar signals. The radome may be configured as a part of a front and rear bumper, grille, or side bodywork or an exterior surface of a vehicle component.

That is, the radome of the radar sensor may be disposed inside a vehicle grille, bumper, body, etc., and may be disposed as a part of components constituting the exterior surface of the vehicle, such as a vehicle grille, bumper, and body portion, thereby improving vehicle aesthetics and the convenience of mounting a radar sensor.

The vehicle control apparatus 100 may further include a driving information sensor 120. The driving information sensor 120 may mean a sensor for detecting driving information of the vehicle. For example, the driving information sensor 120 may include a torque sensor for detecting steering torque, a steering angle sensor for detecting steering angle, a motor position sensor for detecting information on the steering motor, a vehicle speed sensor, and a vehicle motion detection sensor for detecting a movement of the vehicle, a vehicle attitude detection sensor, and the like. In addition to this, the driving information sensor 120 may further include an additional sensor for detecting various data related to the vehicle.

The controller 130 may control the overall operation of the vehicle control apparatus 100. The controller 130 may receive the detection data from the radar 110 and control various operations of the vehicle based on the detection data. The controller 130 may include at least one processor. According to an example, the controller 130 may control the operation of driver assistance systems for the vehicle or perform autonomous driving.

The controller 130 may determine a stationary object among objects based on the detection data received from the radar 110. According to an example, the controller 130 may determine whether the object is the stationary object using speed information of the detected object. The speed information of the object may be obtained based on the Doppler principle of the detection data. The acquisition of the speed information of the object using the radar signal is not limited to a specific method, and various known methods can be applied.

The controller 130 may extract the feature points for the object determined as the stationary object from among objects detected through the radar 110. Since the radar 110 scans surrounding objects at a predetermined cycle, the controller 130 can accumulate the detection data by a predetermined number of times according to the continuous scan of the radar. The controller 130 may search for and extract feature points from the accumulated detection data. If the feature points can be extracted from the detection data acquired by the radar, the method of extracting the feature points is not limited to a specific method, and various known methods can be applied.

The controller 130 may determine whether the stationary object is the guardrail based on the extracted feature points. For example, the controller 130 may determine that the stationary object is the guardrail in the case that the feature points for the stationary object are continuously distributed over a certain distance.

In the present disclosure, the stationary object causing the false target is described as the guardrail, but is not limited thereto. Among the stationary objects, if it is an infrastructure, such as a guardrail, which is continuously and long disposed around the vehicle and can generate the mirror target that is the false target for a real target, the contents of the present disclosure can be applied substantially the same regardless of the name or type.

If the stationary object is determined to be the guardrail, the controller 130 may determine the false target among objects detected by the radar 110 based on the guardrail. For example, the controller 130 may determine the false target in the case that the object located outside the guardrail is traveling in the same direction as the vehicle in consideration of the position of the vehicle and the guardrail.

The controller 130 may use information about the object determined as the false target to control the vehicle. For example, the controller 130 may transmit information about the false target to a driver assistance system or an autonomous driving control device provided in a vehicle using information detected by the radar.

According to an example, the controller 130 may be implemented as a domain control unit (DCU). The domain control unit may operate to control one or more of various driver assistance systems (DAS) used in the vehicle. For example, driver assistance systems may include blind spot detection (BSD) system, lane keeping assist systems (LKAS), adaptive smart cruise control (ASCC) systems, lane departure warning systems (LDWS), lane change assist systems (LCAS), and a parking assistance system (PAS). In addition, the domain control unit may include an autonomous driving module for autonomous driving.

In the case that the controller 130 is implemented as the domain control unit, the controller 130 may exclude false targets when performing functions necessary for driving control of the vehicle. For example, when the controller 130 set a target vehicle in front of the host vehicle to control the ASCC system, the controller may not select an object determined as the false target as the target vehicle. However, this is an example, and is not limited thereto. In the case that functions such as forward collision prevention or avoidance, lane change are performed, the false target may be excluded.

According to this feature, it is possible to prevent the unrecognition or misrecognition of the control targets due to the guardrail by determining the false target caused by the guardrail among objects detected through the radar.

Hereinafter, a method of determining the false target generated by guardrail will be described in more detail with reference to the related drawings.

Figure 2:
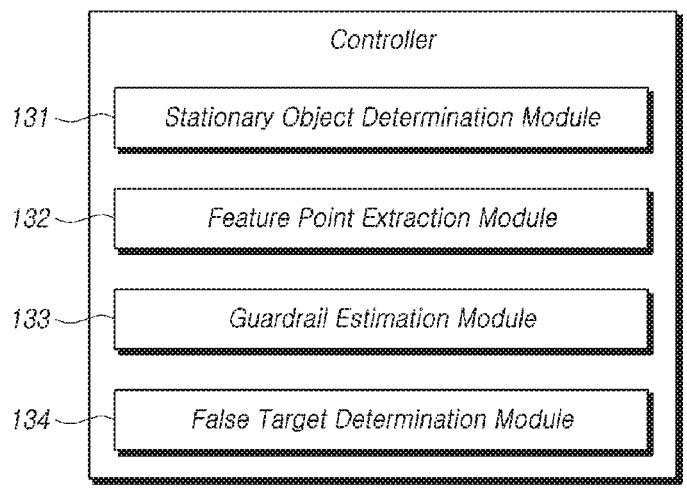
FIG. 2 is a block diagram of the controller according to the present disclosure.

FIG. 2 is a block diagram of the controller according to the present disclosure. FIGS. 3 to 9 are diagrams for explaining guardrail recognition and false target determination operations according to the present disclosure.

Referring to FIG. 2, the controller 130 may include a stationary object determination module 131, a feature point extraction module 132, a guardrail estimation module 133, and a false target determination module 134.

The stationary object determination module 131 may determine the stationary object that is a target object for extracting the feature point among objects detected by the radar. The stationary object determination module 131 may receive the detection data from the radar. The stationary object determination module 131 may determine the stationary object among objects based on the received detection data.

According to an example, the stationary object determination module 131 may determine whether the object is the stationary object using speed information of the detected object. For example, if the relative speed of the object is the same as the speed of the vehicle and the sign of the relative speed is opposite to the speed of the vehicle, the corresponding object can be determined as the stationary object. However, this is an example, and the acquisition of the speed information of the object using the radar signal is not limited to a specific method, and various known methods can be applied.

The stationary object determination module 131 may transmit information on the object determined as the stationary object among the objects to the feature point extraction module 132.

Figure 3:
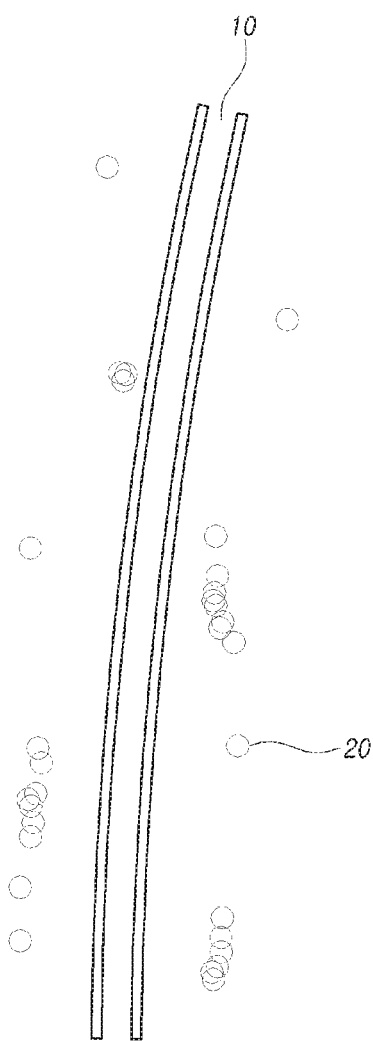
FIGS. 3 to 9 are diagrams for explaining guardrail recognition and false target determination operations according to the present disclosure.
Figure 4:
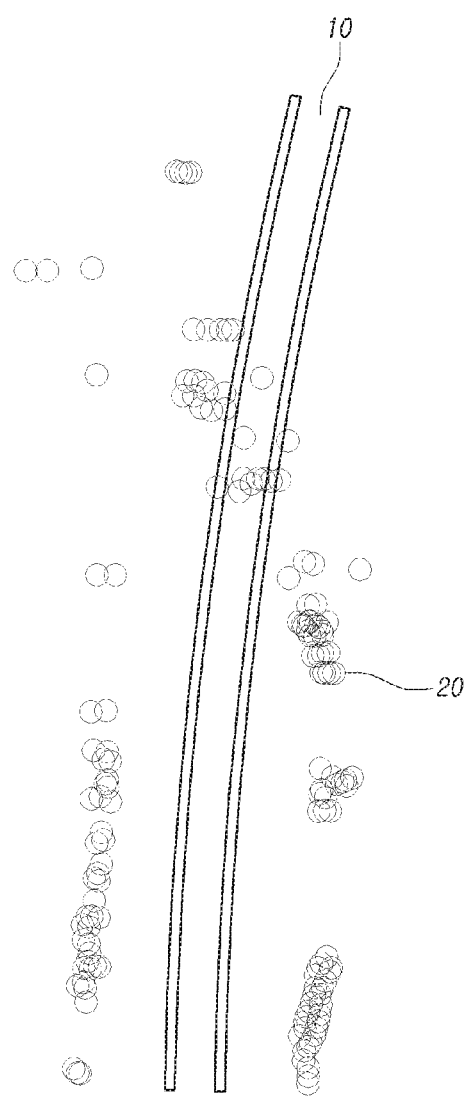

The feature point extraction module 132 may extract the feature point for the object determined as a stationary object. Referring to FIG. 3, an example of detection data obtained by the radar is illustrated. The circles 20 shown in FIG. 3 indicate objects detected based on the radar signal received in one scan by the radar. In addition, the estimated path 10 of the vehicle estimated based on the driving information of the vehicle is also illustrated.

The feature point extraction module 132 may accumulate the detection data for a predetermined number of times to extract the feature points. For example, in FIG. 4, it is illustrated that the detection data obtained by performing the ten scans in the radar is accumulated. The feature point extraction module 132 may perform feature point extraction with the detection data accumulated for a predetermined number of times. However, this is an example, and is not limited thereto. The accumulation number of the detection data for which feature point extraction is attempted may be set differently as necessary. For example, it may be set as a sufficient number of times to determine to the guardrail when extracting the feature point.

The feature point extraction module 132 may correct the movement amount of the vehicle when accumulating the detection data. That is, the error caused by the movement of the vehicle when each scan is performed in the radar may be reflected in the accumulation of each detection data. To this end, the feature point extraction module 132 may receive driving information of the vehicle from the driving information sensor and obtain the movement amount of the vehicle.

Figure 5:
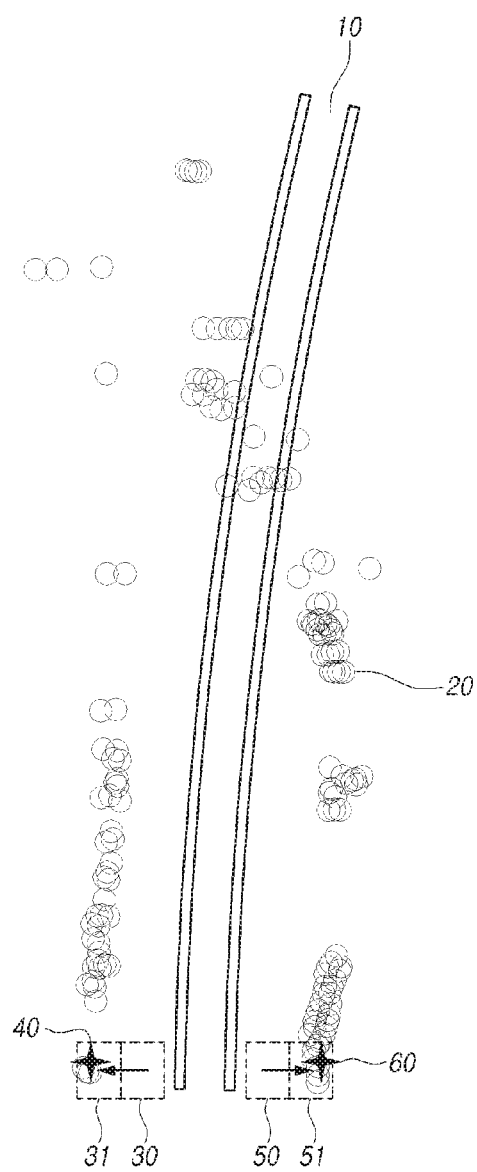

The feature point extraction module 132 may generate a predetermined region in the detection region of the radar as a region of interest (ROI). Referring to FIG. 5, in the detection data, it is illustrated that the region of interest 30 located on the left side of the vehicle and the region of interest 50 located on the right side are set.

The feature point extraction module 132 may move the left region of interest 30 and the right region of interest 50 vertically and horizontally to extract the feature points for the stationary object. According to an example, the feature point extraction module 132 may set the initial positions of the regions of interest 30 and 50 on the left and right sides of the vehicle, respectively. As illustrated in FIG. 5, if there are no objects detected in the regions of interest 30 and 50, the feature point extraction module 132 may move the regions of interest in the horizontal direction (31 and 51), respectively.

According to an example, the feature point extraction may be performed simultaneously on the left and right sides of the vehicle in parallel. That is, the feature point extraction module 132 may extract the feature points while moving the left region of interest 30 and the right region of interest 50 simultaneously.

However, this is an example, and is not limited thereto. The feature point extraction module 132 may generate the region of interest and extract feature points on only one of the left or right sides of the vehicle based on the driving information of the vehicle. For example, on a road having four one-way lanes, if the vehicle travels in the leftmost lane, the feature point extraction module 132 may be set to extract the feature points only on the left side of the vehicle.

The feature point extraction module 132 may extract feature points from the generated region of interest. Referring to FIG. 5, since detection data of the stationary object is present in the left region of interest 31 moved to the left, the feature point extraction module 132 may extract the feature points 40 from the left region of interest 31. Similarly, since the detection data of the stationary object exists in the right region of interest 51 moved to the right, the feature point extraction module 132 may extract the feature points 60 from the right region of interest 51.

According to an example, the feature point extraction module 132 may be configured to extract feature points in the case that the number of detection data for the object existing in the region of interest is greater than or equal to a predetermined number. The predetermined number as the reference for the feature point extraction may be adjusted according to the size of the region of interest. According to an example, a point having the highest density of detection data in the region of interest may be extracted as the feature point.

However, this is an example, if the feature points for the stationary object can be extracted from the region of interest in the detection data acquired by the radar, the method of extracting the feature points is not limited to a specific method, and various known methods can be applied.

Figure 6:
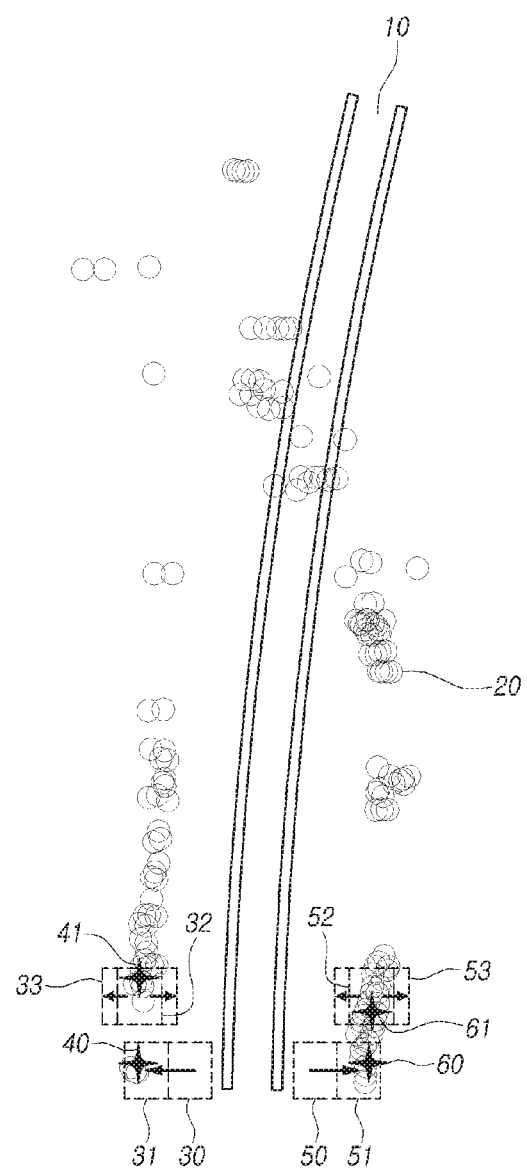

The feature point extraction module 132 may move the region of interest in the moving direction of the vehicle if the feature points for the stationary object are extracted according to the lateral movement of the regions of interest 30 and 50 as described above with reference to FIG. 5. Referring to FIG. 6, the feature point extraction module 132 may extract feature points 41 and 61 from the new regions 32 and 52 formed by moving the left region of interest 31 and the right region of interest 51 upward, respectively. Accordingly, it is possible to extract the feature points more efficiently for the detection data of the radar by setting the initial position and the moving direction of the region of interest for estimating the guardrail.

According to an example, the feature point extraction module 132 may adjust the size of the region of interest. For example, as illustrated in FIG. 6, if the detection data for the stationary object is concentrated in a specific region, the left and right regions of interest 32 and 52 may be expanded to a wider region of interest 33 and 53, respectively. However, the size of the region of interest may be adjusted at a level that is not affected by other stationary objects around the guardrail.

Figure 7:
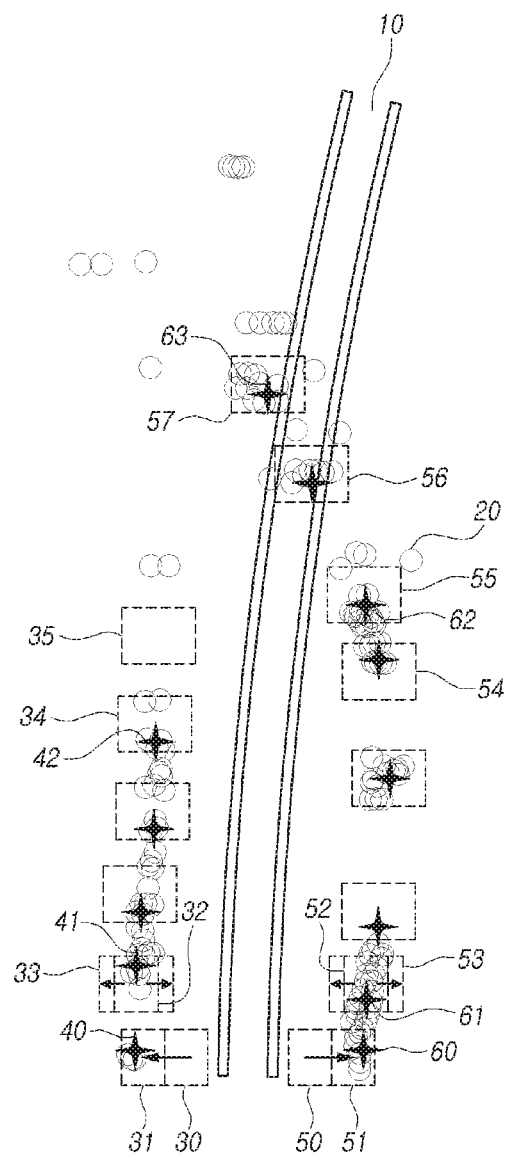

The feature point extraction module 132 may extract the feature points for the stationary object while continuously moving the left and right regions of interest in the longitudinal direction. The feature point extraction module 132 may stop searching for the feature point in the case that the feature point is not extracted during the region of interest moves by a predetermined distance. As shown in FIG. 7, if the feature point is not extracted even if the left region of interest 35 is moved more than a predetermined distance after the feature point 42 is extracted from the left region of interest 34, the feature point extraction module 132 may stop searching for the feature point on the left side of the vehicle.

In this case, if the feature points are continuously extracted from the right side of the vehicle, the feature point extraction module 132 may continue to extract the feature points by moving the right region of interest. The feature point extraction module 132 may stop searching for feature points if the feature points are extracted more than a predetermined number. As illustrated in FIG. 7, when the number of extracted feature points for the right side of the vehicle including the feature points 63 extracted from the right region of interest 57 is greater than or equal to a predetermined number, feature point searching may be stopped.

The feature point extraction module 132 may transmit information about the extracted feature points to the guardrail estimation module 133.

The guardrail estimation module 133 may determine the stationary object as the guardrail in the case that the feature points more than a predetermined number are searched for a predetermined distance or more with respect to the stationary object. That is, the guardrail estimation module 133 may determine whether the number of extracted feature points is greater than or equal to a predetermined threshold. In addition, the guardrail estimation module 133 may determine whether the distance from the first extracted feature point to the last extracted feature point is greater than or equal to a predetermined threshold. The threshold value for the number may be set as needed. Similarly, the threshold value for the distance may be set as needed.

The guardrail estimation module 133 may perform guardrail determination in parallel to the left and right sides of the vehicle, respectively.

The guardrail estimation module 133 may perform polynomial fitting to the extracted feature points to determine the shape of the guardrail. If the curve representing the shape of the guardrail can be estimated based on the location of the feature points, the polynomial fitting method for the feature points is not limited to a specific method, and various known methods can be applied.

Figure 8:
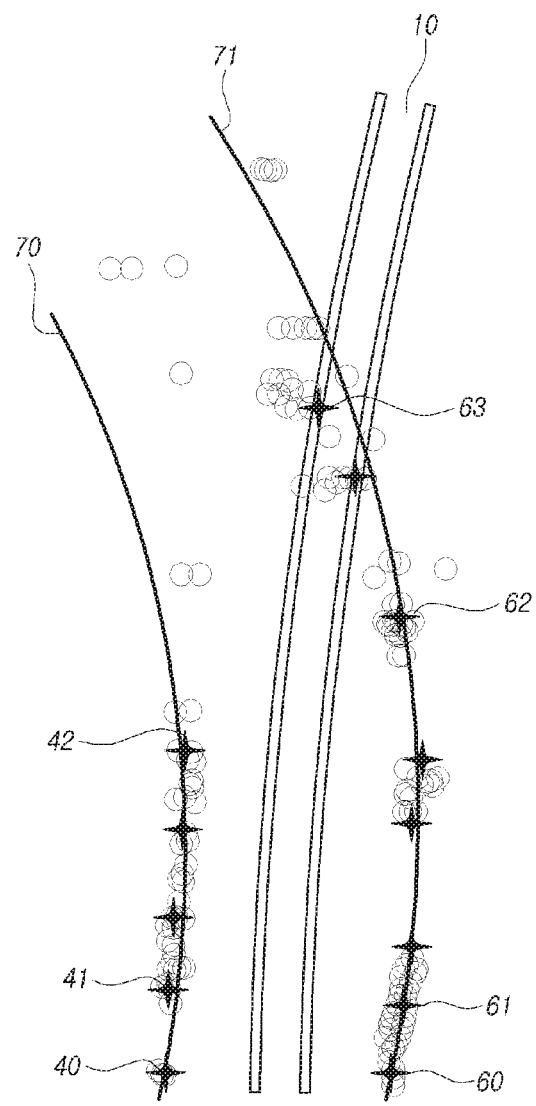

The guardrail estimation module 133 may perform coefficient filtering on coefficients of each term on a result of performing polynomial fitting. As a result of the coefficient filtering, the estimated shape of the guardrail can be smoothly changed as the scan of the radar changes. The coefficient filtering method is not limited to a specific method, and various known methods can be applied. Referring to FIG. 8, curves 70 and 71 showing the shape of the guardrail estimated by polynomial fitting and coefficient filtering are illustrated.

The guardrail estimation module 133 may transmit information about the curve representing the estimated shape of the guardrail to the false target determination module 134.

In the embodiment of FIG. 8, it is assumed that the estimated guardrail is different from the estimated path 10 of the vehicle estimated based on the driving information of the vehicle. In this case, the guardrail estimation module 133 may transmit information on the curve representing the estimated shape of the guardrail to the driver assistance system or autonomous driving control device provided in the vehicle. Accordingly, the driver assistance system or the autonomous driving control device may perform control such as correcting the estimated path of the vehicle using the corresponding information.

The false target determination module 134 may detects a pair of targets located on the left and right sides of the guardrail among the objects, in which a difference in minimum distance to the guardrail of the pair of targets is within a predetermined range, and a difference in speed of the pair of targets is within a predetermined range.

The false target determination module 134 may calculate the minimum distance to the estimated guardrail with respect to the target that is a moving object among objects detected by the radar. To this end, the false target determination module 134 may use the position information of the object detected by the radar and the estimated position of the guardrail.

Figure 9:
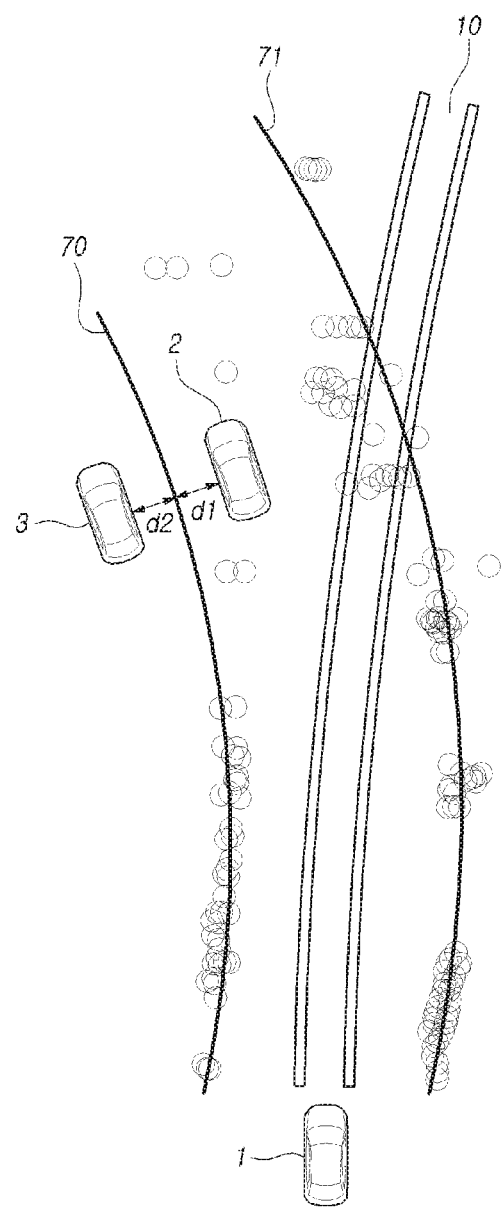

For example, as illustrated in FIG. 9, it is assumed that two moving objects 2 and 3 are detected by the radar in front of the vehicle 1. The false target determination module 134 may determine whether the calculated minimum distance is the same and there is a pair of targets that differ only in the sign of the horizontal position based on the guardrail. The only difference in the sign of the horizontal position relative to the guardrail means that the pair of targets is located on the left and right sides, respectively, relative to the guardrail.

The false target determination module 134 may determine whether the minimum distance d1 of the moving object 2 to the guardrail 70 and the minimum distance d2 of the moving object 3 to the guardrail 70 are the same. Here, the feature that the distances are the same may include cases where the values of d1 and d2 are not only the same, but also the difference between d1 and d2 is within a predetermined range.

If the values of d1 and d2 are the same, the false target determination module 134 may determine whether the positions of the moving object 2 and the moving object 3 differ only in the sign of the horizontal position based on the guardrail. As shown in FIG. 9, since the moving object 2 and the moving object 3 exist on the right and left sides of the guardrail, respectively, only the sign of the horizontal position appears differently.

In this case, the false target determination module 134 may determine whether the speeds of the moving object 2 and the moving object 3 are the same. Also in this case, the feature that the speeds are the same may include cases where the speed of the moving object 2 and the moving object 3 are not only the same, but also the difference in speed between the moving object 2 and the moving object 3 is within a predetermined range.

The false target determination module 134 may determine a target on the opposite side of the vehicle with respect to the guardrail as the false target among pairs of targets having the same calculated minimum distance, different sign of the horizontal position, and the same speed. Referring to FIG. 9, the false target determination module 134 may determine the moving object 3 on the opposite side of the vehicle with respect to the guardrail 70 as the false target. This is because, in general, there cannot be a vehicle driving in the same direction on the opposite side of the guardrail.

The false target determination module 134 may transmit information about the moving object 3 determined to be the false target to the driver assistance system or the autonomous driving control device provided in the vehicle. In this case, the false target determination module 134 may also transmit information about the moving object 2 forming the target pair with the moving object 3 determined as the false target. The driver assistance system or the autonomous driving control device may perform vehicle control using the corresponding information.

According to an example, if the vehicle control apparatus 100 can use information about the detected object to control the vehicle, such as in the driver assistance system or the autonomous driving module, the controller 130 may control the vehicle using the information determined by the false target determination module 134.

For example, in the case that the ASCC system is operating in a vehicle, whether the false target is generated by the guardrail may be determined together, and the detection data determined as the false target may be discarded. Accordingly, during the execution of the ASCC function, it is possible to prevent the control target from being not recognized by the false target or misrecognized as being in the position of the false target.

Alternatively, according to another embodiment, the false target determination module 134 may determine whether the moving target being tracked through the radar is detected as the false target. For example, it is assumed that the preceding vehicle traveling in front is detected and tracked through the radar. In this case, if it appears on the detection data that the preceding vehicle is gradually moved to the direction of the guardrail and is detected outside the guardrail, the false target determination module 134 may determine that the preceding vehicle detected outside the guardrail corresponds to the false target, and may transmit the corresponding information to the driver assistance system or the autonomous driving control device.

According to this embodiment, it is possible to more safely control the vehicle by determining the false target caused by the guardrail among objects detected through the radar and preventing unrecognition or misrecognition of the control targets due to the guardrail.

Figure 10:
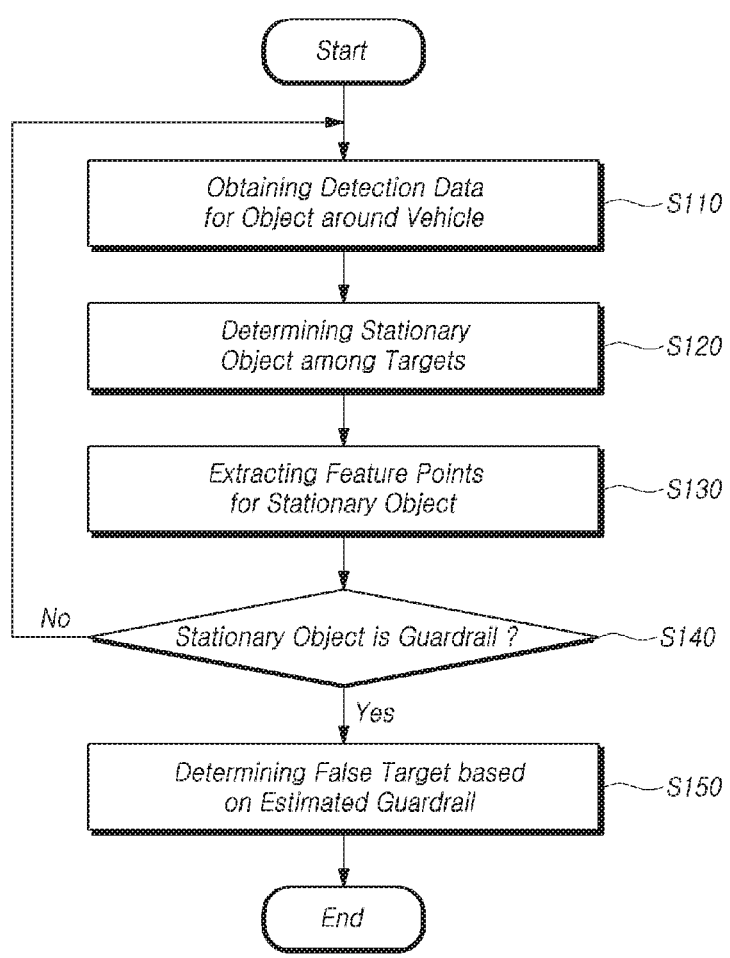
FIG. 10 is a flowchart of a vehicle control method according to the present disclosure.

FIG. 10 is a flowchart of a vehicle control method according to the present disclosure.

The vehicle control method according to the present disclosure may be implemented in the vehicle control apparatus 100 described with reference to FIG. 1. Hereinafter, the vehicle control method according to the present disclosure and an operation of the vehicle control apparatus 100 for implementing the vehicle control method according to the present disclosure will be described in detail with reference to the accompanying drawings.

Referring to FIG. 10, the vehicle control apparatus may transmit a radar signal to the outside of the vehicle, receive a radar signal reflected from an object around the vehicle, and process the received radar signal to obtain the detection data for the object [S110].

The vehicle control apparatus may determine a stationary object among objects based on the obtained detection data [S120]. The vehicle control apparatus may determine whether the object is the stationary object using the detected object speed information. For example, if the speed of the object is the same as the speed of the vehicle and the sign of the speed of the object is opposite to the sign of the speed of the host vehicle, the corresponding object may be determined as the stationary object.

The vehicle control apparatus may extract the feature points for the object determined as the stationary object from among the detected objects [S130]. The vehicle control apparatus may scan surrounding objects at a predetermined period and accumulate detection data according to successive scans for a predetermined number of times. The vehicle control apparatus may search for and extract the feature point from the accumulated detection data.

The vehicle control apparatus may determine whether the stationary object is the guardrail based on the extracted feature points [S140]. For example, if the feature points for the stationary object are continuously distributed over a certain distance, the vehicle control apparatus may determine the stationary object as the guardrail. If the stationary object is not a guardrail (S140, No), the vehicle control apparatus may perform the above-described operations again from step S110.

If the stationary object is determined as the guardrail (S140, Yes), the vehicle control apparatus may determine the false target among objects detected with respected to the guardrail [S150]. For example, the vehicle control apparatus may determine the false target when an object located outside the guardrail is traveling in the same direction as the vehicle in consideration of the location of the vehicle and the position of the guardrail.

The vehicle control apparatus may use information about an object determined as the false target to control the vehicle. For example, the vehicle control apparatus may transmit information about the false target to the driver assistance system or the autonomous driving control device provided in a vehicle using information detected by the radar. Alternatively, the vehicle control apparatus may perform control of the vehicle using information about the false target.

According to the present disclosure, it is possible to prevent unrecognition or misrecognition of the control targets due to the guardrail by determining the false target caused by the guardrail among objects detected through the radar.

Hereinafter, with reference to the related drawings, an operation related to determining the false target will be described in detail.

Figure 11:
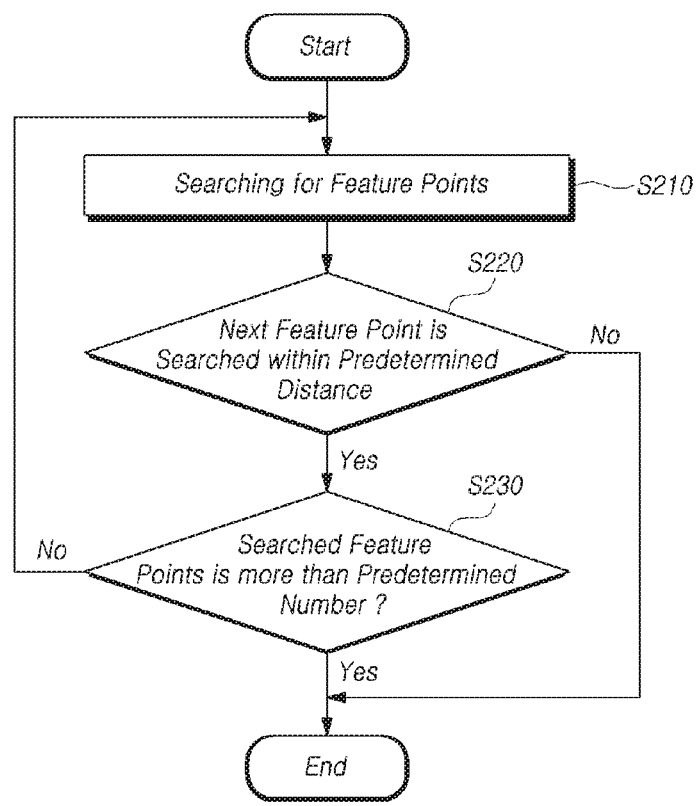
FIG. 11 is a flowchart illustrating a method of searching for feature points according to the present disclosure.
Figure 12:
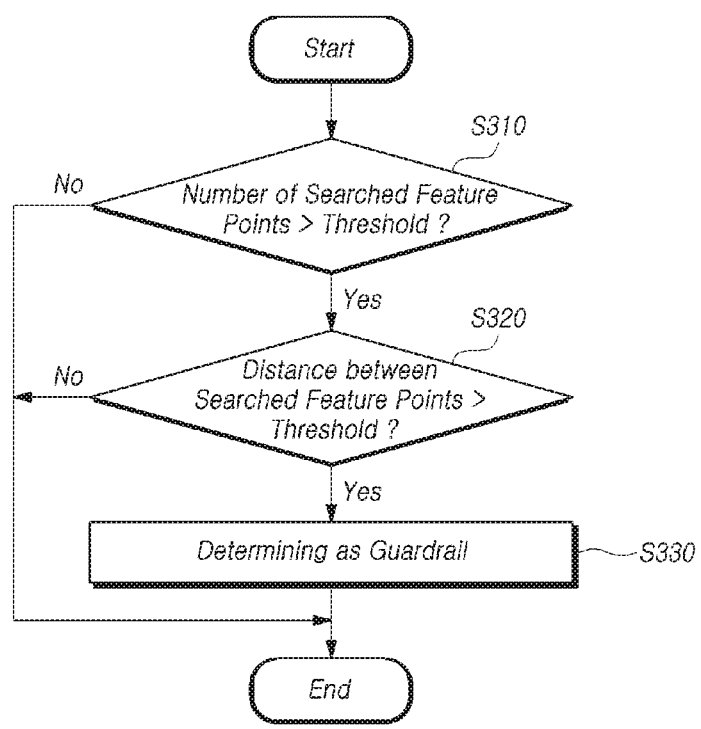
FIG. 12 is a flowchart illustrating a method for determining the guardrail according to the present disclosure.
Figure 13:
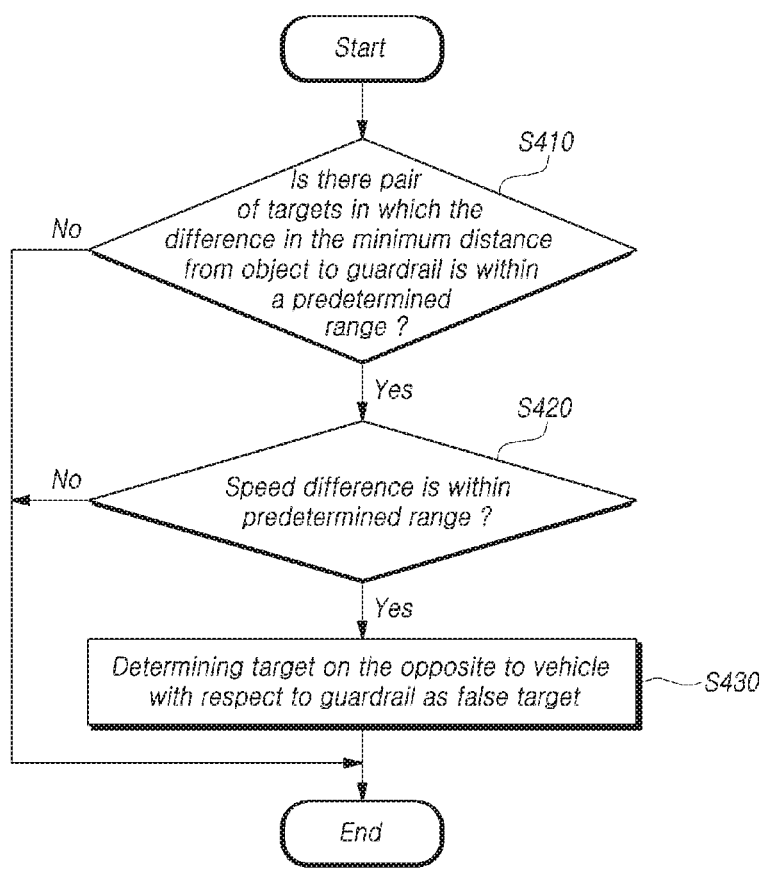
FIG. 13 is a flowchart illustrating a method of determining the false target according to the present disclosure.

FIG. 11 is a flowchart illustrating a method of searching for feature points according to the present disclosure, FIG. 12 is a flowchart illustrating a method for determining the guardrail according to the present disclosure, and FIG. 13 is a flowchart illustrating a method of determining the false target according to the present disclosure.

Referring to FIG. 11, a detailed flowchart of the method for searching for the feature point according to the step S130 in FIG. 10 is illustrated. The vehicle control apparatus may search for the feature point for the object determined to be the stationary object [S210]. The vehicle control apparatus may accumulate detection data for a predetermined number of times in order to extract the feature point. The vehicle control apparatus may perform feature point extraction in a state in which the detection data for a predetermined number of times is accumulated. The accumulation number of the detection data for the feature point extraction may be set as necessary. For example, the accumulation number of the detection data may be set a sufficient number of times to determine the guardrail through the extraction of the feature points.

The vehicle control apparatus may correct the movement amount of the vehicle when accumulating the detection data. That is, the error caused by the movement of the vehicle when each scan is performed in the radar may be reflected in the accumulation of the detection data. To this end, the vehicle control apparatus may receive driving information of the vehicle from the driving information sensor.

The vehicle control apparatus may generate a predetermined region within the detection region of the radar as the region of interest (ROI). The region of interest may be set as the region of interest located on the left side of the vehicle and the region of interest located on the right side of the vehicle. The vehicle control apparatus may extract the feature point for the stationary object by moving the left and right regions of interest in the vertical and horizontal directions. The vehicle control apparatus may move the region of interest in the case that there is no object detected in the region of interest or the feature point is extracted from the region of interest.

According to an example, the feature point extraction may be performed simultaneously on the left and right sides of the vehicle in parallel. That is, the vehicle control apparatus may extract feature points while simultaneously moving the left and right regions of interest at the same time.

The vehicle control apparatus may extract feature points from the generated region of interest. If the detection data of the stationary object exists in the region of interest, the vehicle control apparatus may extract the feature point from the region of interest. The method of extracting the feature points is not limited to a specific method, and various known methods can be applied.

If the feature point for the stationary object is extracted, the vehicle control apparatus may move the region of interest in the traveling direction of the vehicle. According to an example, the vehicle control apparatus may adjust the size of the region of interest as needed. For example, if the detection data for the stationary object is concentrated in a specific area, the left and right regions of interest may be widened, respectively.

The vehicle control apparatus may extract feature points for the stationary object while continuously moving the left and right regions of interest. The vehicle control apparatus may determine whether the next feature point is searched within a predetermined distance [S220]. In the case that the feature point is not extracted while moving the region of interest over a predetermined distance (S220, No), the vehicle control apparatus may stop searching for the feature point.

If the next feature point is continuously extracted within a predetermined distance (S220 Yes), the vehicle control apparatus may continuously extract the feature point by moving the region of interest. The vehicle control apparatus may determine whether or not a predetermined number of feature points are extracted [S230]. If more than a predetermined number of feature points are not extracted (S230, No), the vehicle control apparatus may continuously perform feature point searching. If more than a predetermined number of feature points are extracted (S230, Yes), the vehicle control apparatus may stop searching for the feature points. Thereafter, step S140 of FIG. 10 may be performed.

Referring to FIG. 12, a detailed flowchart of the guardrail determination method of step S140 in FIG. 10 is illustrated. The vehicle control apparatus may determine whether the number of extracted feature points is greater than or equal to a predetermined threshold [S310]. If the number of searched feature points is less than the threshold (S310, No), the stationary object is not determined as the guardrail, and the vehicle control apparatus may return to step S110 of FIG. 10 to perform the above-described operations again.

In the case that the number of searched feature points is greater than or equal to the threshold (S310, Yes), the vehicle control apparatus may determine whether the distance from the first extracted feature point to the last extracted feature point is greater than or equal to a predetermined threshold [S320]. The vehicle control apparatus may simultaneously perform the determination of the guardrail in parallel with respect to the left and right sides of the vehicle.

If the distance from the first extracted feature point to the last extracted feature point is shorter than the threshold value (S320, No), the stationary object is not determined as the guardrail, and the vehicle control apparatus may return to step S110 of FIG. 10 to perform the above-described operations again.

If the distance from the first extracted feature point to the last extracted feature point is greater than or equal to a threshold (S320, Yes), the vehicle control apparatus may determine the stationary object as the guardrail [S330]. If the stationary object is determined to be the guardrail, the vehicle control apparatus may determine the shape of the guardrail by performing polynomial fitting to the extracted feature points.

The vehicle control apparatus may perform coefficient filtering on the coefficient of each term on the result of performing the polynomial fitting. As a result of the coefficient filtering, as the scan of the radar changes, the estimated shape of the guardrail can be changed smoothly. Thereafter, step S150 of FIG. 10 may be performed.

Referring to FIG. 13, a detailed flowchart of the false target determination method of step S150 in FIG. 10 is illustrated. The vehicle control apparatus may determine whether there is a pair of targets in which the difference in the minimum distance from the detected object to the guardrail is within a predetermined range [S410]. The vehicle control apparatus may calculate the minimum distance to the estimated guardrail with respect to a target that is a moving object among the detected objects. To this end, the vehicle control apparatus may utilize the position information of the object detected by the radar and the estimated position information of the guardrail.

The vehicle control apparatus may determine whether there is a pair of targets having the same calculated minimum distance and differing only in the sign of the lateral position with respect to the guardrail. The only difference in the sign of the lateral position relative to the guardrail may mean that the pair of targets is located on the left and right sides, respectively, relative to the guardrail.

The vehicle control apparatus may determine whether the minimum distance to the guardrail of one moving object of the pair of targets is the same as the minimum distance to the guardrail of the other moving object. Here, the meaning of the same distance may include not only the case where the minimum distance is the same, but also the case where the difference between the minimum distances is within a predetermined range.

If the minimum distances are equal to each other, the vehicle control apparatus may determine whether the positions of the two moving objects forming the pair of targets differ only in the sign of the horizontal or lateral position with respect to the guardrail.

If there is no pair of targets in which a minimum distance with respect to the guardrail is within a predetermined range (S410, No), the vehicle control apparatus may determine that there is no false object, and terminate the false object determination step.

If there is a pair of targets in which a minimum distance with respect to the guardrail is within a predetermined range (S410, Yes), the vehicle control apparatus may determine whether the speeds of the two moving objects forming the pair of targets are the same. Also in this case, the meaning of the same speed may include not only the case where the speeds of the two moving objects are the same, but also the case where the speed difference between the two moving objects is within a predetermined range.

If the speed difference between the two moving objects is not within a predetermined range (S420, No), the vehicle control apparatus may determine that there is no false object, and terminate the false object determination step.

If the speed difference between the two moving objects is within a predetermined range (S420, Yes), the vehicle control apparatus may determine the target on the opposite to the vehicle with respect to the guardrail as the false target among the pair of targets having the same calculated minimum distances, the different signs of the horizontal position, and the same speeds [S430]. The vehicle control apparatus may determine the moving object on the other side of the vehicle with respect to the guardrail as the false target. This is because, in general, there cannot be a vehicle traveling in the same direction on the opposite side of the guardrail.

The vehicle control apparatus may transmit information on a moving object determined as the false target to the driver assistance system or the autonomous driving control device provided in the vehicle. In this case, the vehicle control apparatus may also transmit information about the moving object forming the target pair with the object determined as the false target. The driver assistance system or the autonomous driving control device may perform vehicle control using the corresponding information.

According to an example, if the vehicle control apparatus can use information about the detected object to control the vehicle, such as in the driver assistance system or the autonomous driving module, the vehicle control apparatus may control the vehicle using the information determined as the false target For example, in the case that the ASCC system is operating in the vehicle, whether the false target is generated by the guardrail may be determined together, and the detection data determined as the false target may be discarded. Accordingly, during the execution of the ASCC function, it is possible to prevent the control target from being not recognized by the false target or misrecognized as being in the position of the false target.

According to the embodiments, it is possible to more safely control the vehicle by determining the false target caused by the guardrail among objects detected through the radar and preventing the unrecognition or misrecognition of the control targets due to the guardrail.

The various components according to the present disclosure described above may be embodied as computer readable codes on a medium in which a program is recorded. The computer-readable medium includes all types of recording devices in which data readable by a computer system is stored. Examples of computer-readable media include a hard disk drive (HDD), solid state disk (SSD), silicon disk drive (SDD), ROM, RAM, CD-ROM, magnetic tape, floppy disk, and optical data storage device. It also includes those implemented in the form of carrier waves (eg, transmission over the Internet).

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A control apparatus of a vehicle, comprising:
   a radar for receiving radar signals transmitted from the vehicle and reflected from objects around the vehicle and processing the received radar signals to obtain detection data for the objects; and
   a controller for
     determining a stationary object among the objects based on the detection data,
     extracting feature points,
       determining whether the stationary object is a guardrail based on the extracted feature points, and
       determining a false target among the objects based on the guardrail,
   wherein
     the controller is configured to detect a pair of targets located on left and right sides of the guardrail among the objects, in which a difference in minimum distance to the guardrail of the pair of targets is within a predetermined range, and a difference in speed of the pair of targets is within a predetermined range, and
     the controller is configured to control the vehicle based on the determined false target.

2. The control apparatus of the vehicle of claim 1, wherein the controller is configured to accumulate the detection data by a predetermined number of times, and extract the feature points from the accumulated detection data.

3. The control apparatus of the vehicle of claim 2, wherein the controller is configured to acquire a movement amount of the vehicle based on driving information of the vehicle, and correct the movement amount of the vehicle for each detection data when accumulating the detection data.

4. The control apparatus of the vehicle of claim 1, wherein the controller is configured to generate a predetermined region within a detection region of the radar as a region of interest (ROI), and extract the feature points from the region of interest.

5. The control apparatus of the vehicle of claim 4, wherein the controller is configured to search for the feature points by moving the region of interest within the detection region of the radar.

6. The control apparatus of the vehicle of claim 5, wherein, when the feature points of a predetermined number or more are searched for a predetermined distance or more with respect to the stationary object, the controller determines the stationary object as the guardrail.

7. The control apparatus of the vehicle of claim 6, wherein the controller is configured to perform the feature point extraction and the guardrail determination on left and right sides of the vehicle, respectively.

8. The control apparatus of the vehicle of claim 1, wherein the controller is configured to perform a polynomial fitting to the feature points to determine a shape of the guardrail.

9. The control apparatus of the vehicle of claim 1, wherein the controller is configured to determine a target on an opposite side of the vehicle with respect to the guardrail as the false target from the pair of targets.

10. A control method of a vehicle, comprising:
    obtaining detection data on objects around the vehicle through a radar;
    determining a stationary object among the objects based on the detection data;
    extracting feature points for the stationary object;
    determining whether the stationary object is a guardrail based on the extracted feature points; and
    determining a false target among the objects based on the guardrail,
    the determining of the false target comprises detecting a pair of targets located on left and right sides of the guardrail among the objects, in which a difference in minimum distance to the guardrail of the pair of targets is within a predetermined range, and a difference in speed of the pair of targets is within a predetermined range,
    wherein the vehicle is controlled based on the determined false target.

11. The control method of the vehicle of claim 10, wherein the determining of the stationary object comprises accumulating the detection data by a predetermined number of times, and extracting the feature points from the accumulated detection data.

12. The control method of the vehicle of claim 11, wherein the determining of the stationary object comprises acquiring a movement amount of the vehicle based on driving information of the vehicle, and correcting the movement amount of the vehicle for each detection data when accumulating the detection data.

13. The control method of the vehicle of claim 10, wherein the extracting of the feature points comprises generating a predetermined region within a detection region of the radar as a region of interest (ROI), and extracting the feature points from the region of interest.

14. The control method of the vehicle of claim 13, wherein the extracting of the feature points comprises searching for the feature points by moving the region of interest within the detection region of the radar.

15. The control method of the vehicle of claim 14, wherein, the determining of whether the stationary object is the guardrail comprises, when the feature points of a predetermined number or more are searched for a predetermined distance or more with respect to the stationary object, estimating the stationary object as the guardrail.

16. The control method of the vehicle of claim 15, wherein the extracting of the feature points and the determining of whether the stationary object is the guardrail are performed on left and right sides of the vehicle, respectively.

17. The control method of the vehicle of claim 10, wherein the determining of whether the stationary object is the guardrail comprises performing a polynomial fitting to the feature points and determining a shape of the guardrail.

18. The control method of the vehicle of claim 10, wherein the determining of the false target comprises determining a target on an opposite side of the vehicle with respect to the guardrail as the false target from the pair of targets.

* * * * *